Nov. 18, 1969   R. GILMONT ET AL   3,478,779
VACUUM GAUGE ASSEMBLY
Original Filed Aug. 19, 1963   2 Sheets-Sheet 1
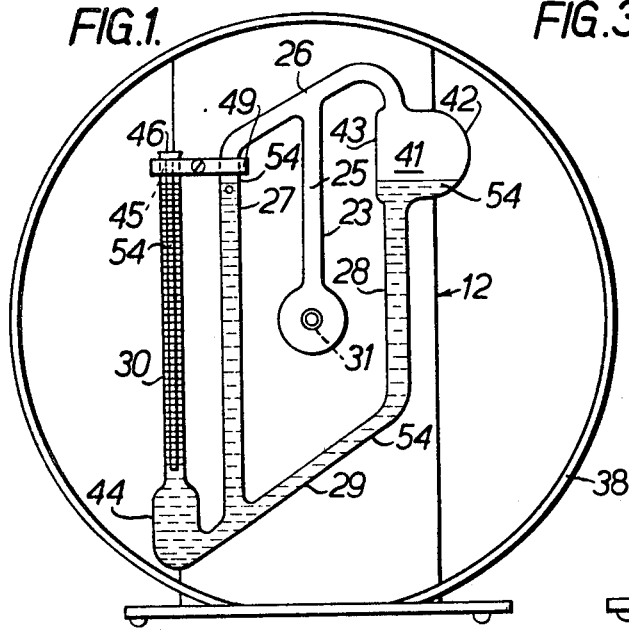
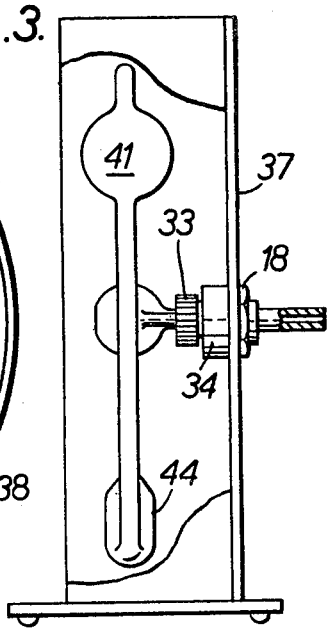
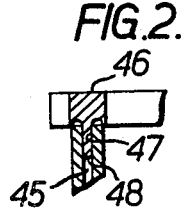
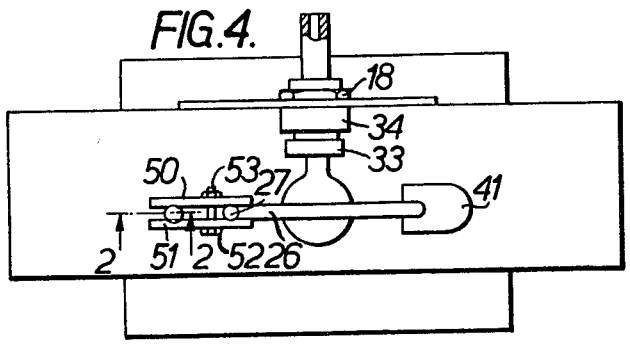
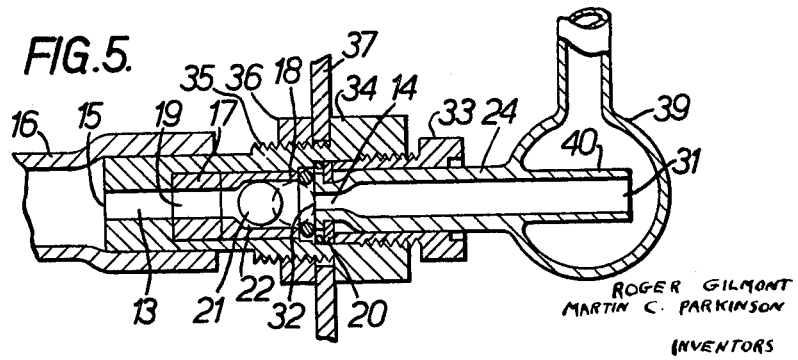
ROGER GILMONT
MARTIN C. PARKINSON
INVENTORS
ATTORNEY

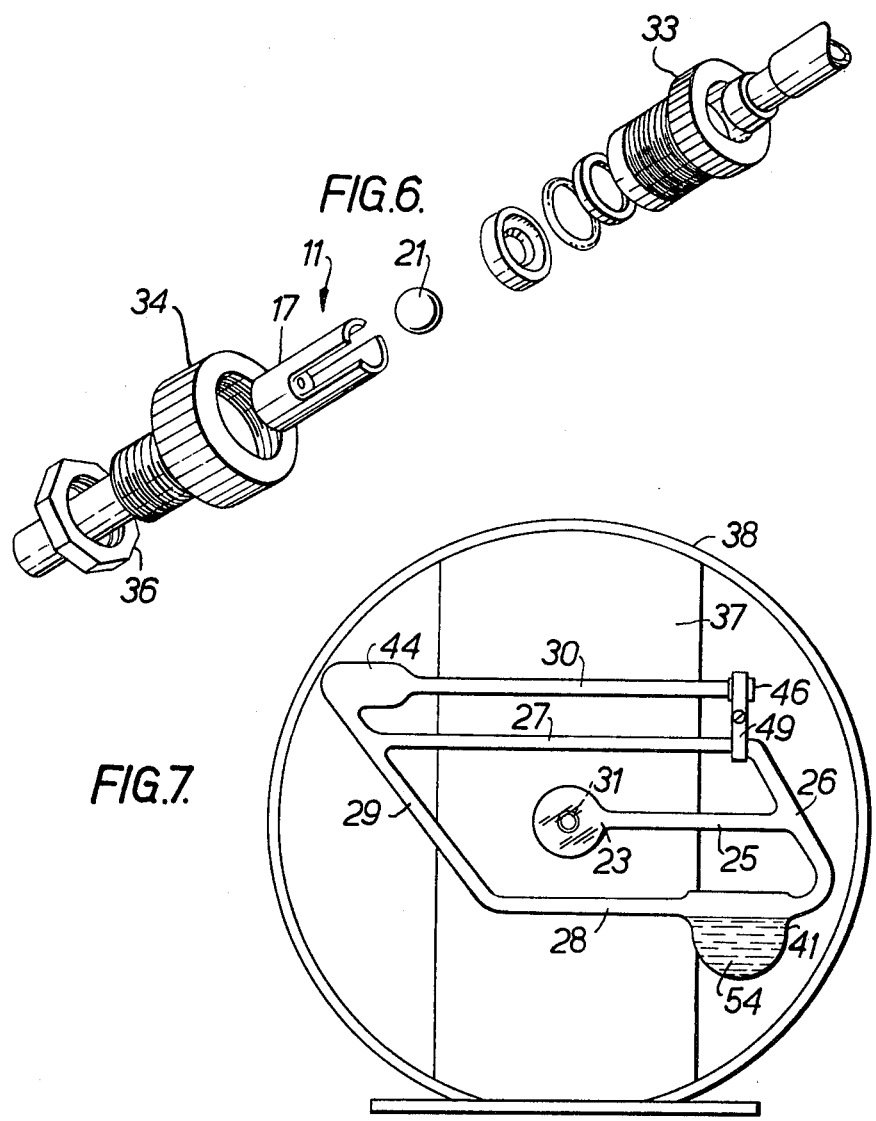

United States Patent Office 3,478,779
Patented Nov. 18, 1969

3,478,779
VACUUM GAUGE ASSEMBLY
Roger Gilmont, Douglaston, and Martin C. Parkinson, Hyde Park, N.Y., assignors to The Virtis Company, Inc., Gardiner, N.Y., a corporation of New York
Original application Aug. 19, 1963, Ser. No. 303,061. Divided and this application May 2, 1966, Ser. No. 560,342
Int. Cl. F16k *17/00, 21/04*
U.S. Cl. 137—615                    3 Claims

ABSTRACT OF THE DISCLOSURE

A valve mechanism for use in vacuum gauges and the like having a tubular glass stem received in a conduit. Sealing means seals the glass stem to the conduit while permitting relative rotation of the gauge. A ball member seats against the sealing means to prevent inrush of air into the tubular stem.

---

This invention relates to a vacuum gauge assembly having a number of novel features. These features all cooperate to produce a vacuum gauge assembly which is considerably superior to those heretofore made. However a number of the individual features also have separate utilization and therefore are separately claimed.

This is a divisional application covering the check valve portion of the vacuum gauge assembly disposed in our parent application, Ser. No. 303,061, filed Aug. 19, 1963.

In vacuum gauge assemblies of the type set forth in the instant invention circumstances occur in operation wherein the vacuum producing means which are connected to the assembly are rendered inoperative and atmospheric air rushes into the mechanism. When this occurs in the conventional assembly a surge of air pressure enters the device. This causes violent fluctuations in the mercury level and can cause breakage of the parts.

Furthermore, in the conventional device, the arm containing the indicating graduations is permanently closed at its upper portion. In use dirt and other impurities enter the device and discolor the interior of the arm. Because of the construction thereof, in the conventional apparatus, there is no simple and effective way to clean the device. Hence, after a protracted period of use, the device becomes inoperative requiring costly replacement of parts. In the instant apparatus the arm containing the indicating graduations is open at its upper portion and a cap is removably disposed about the opening. Hence cleaning of the device is quite simple being done by removal of the cap and insertion of conventional cleaning brushes.

Furthermore, in the preferred modification of this invention, the cap contains a projecting stem portion which extends into the opening at the top of the said arm. The stem portion, which is preferably of the same diameter as that of the opening into which it extends, has a flat lower portion so that extremely accurate pressure measurements can be made.

Also, in conventional devices of the type involved herein, the supply bowl containing the mercury or other indicating fluid is of conventional rounded construction both on the top and the bottom. When the conventional device is moved to its initial position for commencement of the reading operation a clear air flow is not produced so that inaccuracies of reading and possible splashing of fluid occur. In the device of this invention the supply bowl contains a flat upper portion so that this difficulty is obviated.

The foregoing constitutes a brief description of the instant invention and the advantages thereof. The invention will now be further described by reference to the accompanying drawings which are made a part of this specification.

FIG. 1 is a front elevational view of a vacuum indicating mechanism made in accordance with this invention with the device in the position that it normally assumes when a reading of vacuum is being taken.

FIG. 2 is a detail cross-sectional view on an enlarged scale showing the cap member and associated clamp means in position within the opening provided at the top of the indicating arm taken along lines 2—2 of FIG. 4.

FIG. 3 is a side elevational view, partly in section, of the device shown in FIG. 1.

FIG. 4 is a plan view of the device shown in FIGS. 1 and 3.

FIG. 5 is a detail cross-sectional view, on an enlarged scale, of the valve mechanism utilized in the device of the instant invention and associated parts showing the valve mechanism in its normal position when the instant invention is operative. The position of the valve mechanism when the vacuum producing means are rendered inoperative is shown in phantom lines.

FIG. 6 is an exploded perspective view of the components of the valve mechanism of FIG. 5.

FIG. 7 is a front elevational view of the device shown in FIG. 1 but showing the position of the vacuum indicating mechanism in its initial condition.

The invention will now be further described by reference to the specific forms thereof shown in the accompanying drawings. However the reader is cautioned to note that these specific forms and modifications, which represent the best modes known to the applicants of taking advantage of their invention, are for specific illustration and for purposes of example only. Various changes and modifications may obviously be made within the spirit and scope of this invention and would occur to those skilled in this art.

The vacuum gauge assembly of the instant invention is divided into two basic parts which are the valve mechanism 11 and the vacuum indicating mechanism 12. The valve mechanism 11 is formed with a conduit 13 which contains first inlet opening 14 and first outlet opening 15. First outlet opening 15 is connected to junction member 16 which in turn is connected to a vacuum producing mechanism such as a vacuum pump (not shown).

A sleeve 17 is disposed within conduit 13 and is provided with second inlet opening 18 and second outlet opening 19. Sleeve 17 is formed with an enlarged portion 22 therewithin. A seat 20 is disposed within second inlet opening 18. A ball 21 of larger diameter than the opening within seat 20 is movable within enlarged portion 22 of sleeve 17.

Vacuum indicating mechanism 12 is formed with a continuous hollow body 23 having a stem portion 24 and integral first, second, third, fourth, fifth and sixth arms 25, 26, 27, 28, 29 and 30. Stem portion 24 is formed with an inlet opening 31 and an outlet opening 32. Threaded member 33 is disposed about stem portion 24 and is threadedly connected to socket member 34. Socket member 34 bears a threaded extension 35 which in turn is connected to nut 36.

A support 37 is secured into position as indicated in FIG. 3. Support 37 bears a guard portion 38 so as to prevent damage to the vacuum indicating mechanism.

First arm 25 bears a first bowl portion 39 at an end portion thereof and an end portion 40 of stem 24 extends into bowl 39. The opposite end portion of arms 25 is connected to arm 26 at an intermediate portion thereof. An end portion of arm 28 and of arm 27 are connected to opposite end portions of arm 26. A second bowl portion 41 is connected to an intermediate portion of arms 28. Bowl 41 bears a rounded portion 42 and a flat portion 43.

The opposite end portion of arm 28 is connected to an end portion of arm 29 and the opposite end portion of arm 27 is connected to an intermediate portion of arm 29. Arm 30 bears a third bowl portion 44 at an end portion thereof which is connected to an end portion of arm 29. The opposite end portion of arm 30 is formed with an opening 45. A cap 46 is formed with a projecting stem portion 47 having a flat bottom 48. Stem 47 extends into opening 45 and cap 46 is secured in position by clamp 49 which consists of a pair of interlocking arms 50 and 51 extending between arms 30 and 27. Arms 50 and 51 are squeezed in opposing relationship by screw 52 and nut 53.

The level of vacuum is indicated by fluid 54 which is disposed within body 23. In the preferred modification of this invention the fluid utilized is mercury.

With the foregoing specific description of this invention the operation thereof may now be explained.

After the vacuum gauge assembly is connected to vacuum producing means through junction member 16 body 23 is rotated within support 37 to assume the position shown in FIG. 7. It is noted that, in this position, fluid 54 is disposed entirely within bowl 41 so that continuous exhaustion of air occurs through body 23. After the vacuum has been stabilized so that a reading is desired body 23 is rotated about support 37 to assume the position shown in FIG. 1. At this point fluid 54 assumes the position shown in FIG. 1 and attains the height which is dependent upon the residual air which is trapped within body 23.

If, during the operation of the instant invention, the vacuum producing means should temporarily become inoperative so that atmospheric air would normally rush into the interior of body 23, ball 22 becomes operative. The influx of atmospheric air through first outlet opening 15 will push ball 22 against seat 20 and thus will prevent any influx of atmospheric air into stem 24 and thus into the interior of body 23. If the vacuum producing means are thereafter actuated and the break in the system repaired ball 22 will then move away from seat 20 and will permit proper functioning of the device.

If the interior of arm 30 becomes dirty after a period of operation of vacuum indicating mechanism 12 the operator need only remove clamp 49 from arm 30 and then remove cap 46 from opening 45. A conventional cleaning brush can now be inserted into opening 45 and the device cleaned. In performing this operation body 23 is preferably turned to the position shown in FIG. 1.

Because of the accurately flattened bottom 48 of stem 47 (which flatness cannot be produced by conventional glass-forming techniques) an extremely accurate reading of the vacuum produced can be obtained.

The preferred material of which body 23 is made is glass; the preferred indicating fluid is mercury; cap 46 and stem 47 are preferably made of rubber or other resilient materials; the components of the valve mechanism can be any suitable material adapted for the purpose which is well known to those skilled in this art.

The foregoing specific description indicates the manner in which the objects of this invention are achieved.

We claim:
1. A one-way valve mechanism for a vacuum gauge assembly of the type used on freeze dryers and the like, said valve mechanism including a conduit open at opposite ends, means to fixedly attach said conduit in a support, a tubular stem forming an outlet opening of a vacuum gauge, said tubular stem having one end thereof extending into one end of said conduit, means to hold said tubular stem axially within said end of said conduit while permitting free rotation relative thereto, an annular sealing means positioned in said conduit for continuous engagement with said end of said tubular stem, said sealing means sealing said conduit to said tubular stem of said vacuum gauge during rotational movement relative thereto, and a ball member carried in said conduit, said conduit being of a larger diameter than said ball member adjacent said sealing means to permit free axial movement of said ball member into seating engagement with said sealing means to prevent air flow into said vacuum gauge, said ball member being normally released from engagement with said sealing means to permit free flow of fluid through said conduit and tubular stem when vacuum is applied to said end opposite that containing said tublar stem.

2. A valve mechanism of the type described in claim 1 wherein said tubular stem is formed with an annular flange on said end thereof, said annular flange providing a flat face for circumferentially continuous engagement with said sealing means.

3. The valve mechanism of claim 1 wherein said tubular stem is formed of glass.

References Cited

UNITED STATES PATENTS

| | | | |
|---|---|---|---|
| 1,078,347 | 11/1913 | Haas | 137—519.5 X |
| 2,929,406 | 3/1960 | Anderson | 137—615 |
| 3,111,136 | 11/1963 | Peridsky | 251—368 X |

FOREIGN PATENTS 5,647    1913    Great Britain.

WILLIAM F. O'DEA, Primary Examiner

D. J. ZOBKIW, Assistant Examiner

U.S. Cl. X.R.

137—519.5; 251—148